(12) United States Patent
Kersey

(10) Patent No.: US 6,274,863 B1
(45) Date of Patent: Aug. 14, 2001

(54) SELECTIVE APERTURE ARRAYS FOR SEISMIC MONITORING

(75) Inventor: Alan D. Kersey, South Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/360,879

(22) Filed: Jul. 23, 1999

(51) Int. Cl.$^7$ .................................................. G01B 9/02

(52) U.S. Cl. .............................. 250/227.14; 250/227.19; 356/32; 385/12

(58) Field of Search .................. 356/32, 342; 250/231.1, 250/227.14, 227.19, 227.27; 73/800, 154, 152, 153; 359/109; 385/12, 37

(56) References Cited

U.S. PATENT DOCUMENTS

| | | |
|---|---|---|
| H1813 | 11/1999 | Kersey . |
| 4,589,285 | 5/1986 | Savit ........................................ 73/655 |
| 4,889,986 | 12/1989 | Kersey et al. . |
| 4,950,883 | 8/1990 | Glenn .............................. 250/227.14 |
| 4,996,419 | 2/1991 | Morey ............................. 250/227.18 |
| 5,231,611 | 7/1993 | Laznicka, Jr. ........................ 367/149 |
| 5,361,130 | 11/1994 | Kersey et al. ........................ 356/345 |
| 5,363,342 | 11/1994 | Layton et al. ........................ 367/149 |
| 5,401,956 | 3/1995 | Dunphy et al. ................. 250/227.18 |
| 5,410,404 | 4/1995 | Kersey et al. . |
| 5,426,297 | 6/1995 | Dunphy et al. ................. 250/227.23 |
| 5,488,475 | 1/1996 | Friebele et al. . |
| 5,493,390 | 2/1996 | Varasi et al. ............................ 356/32 |
| 5,680,489 | 10/1997 | Kersey . |
| 5,706,079 | 1/1998 | Kersey . |
| 5,748,312 | 5/1998 | Kersey et al. . |
| 5,757,487 | 5/1998 | Kersey . |

(List continued on next page.)

FOREIGN PATENT DOCUMENTS

| | | |
|---|---|---|
| 2248498 | 4/1992 | (GB) . |
| 9835208 | 8/1998 | (WO) . |
| 9928713 | 6/1999 | (WO) . |

OTHER PUBLICATIONS

CiDRA Corporation May 1998, "Applications of Optical Fiber Bragg Grating Sensors for the Seismic Industry," pp. 1–12.

"Fiber Bragg Grating Array Sensor System Using a Bandpass Wavelength Division Multiplexer and Interferometric Detection", *Berkoff et al.*, IEEE Photonics Technology Letters, US, IEEE Inc., New York, vol. 8, No. 11, Nov. 1, 1996, pp. 1522–1524.

*Primary Examiner*—Stephone B. Allen
(74) *Attorney, Agent, or Firm*—Ware, Fressola, Van Der Sluys & Adolphson, LLP

(57) ABSTRACT

A seismic sensing device has a light source, detection measuring and processing device in combination with an optical seismic sensor reconfigurable array. The light source, detection measuring and processing device provides a selective optical signal to the optical seismic sensor reconfigurable array, and responds to an optical seismic sensor reconfigurable array signal, for providing information about a seismic force to be sensed. The optical seismic sensor reconfigurable array responds to the selective optical signal, and responds to the seismic force, for providing an optical seismic sensor reconfigurable array signal containing information about the seismic force over at least one selective length of the optical seismic sensor reconfigurable array. The optical seismic sensor reconfigurable array includes an optical fiber having optical seismic sensors, each having at least one sensor coil arranged between a respective adjacent Fiber Bragg Grating partial reflector pair having a selectable wavelength. The optical seismic sensor reconfigurable array includes a common optical seismic sensor having a sensor coil arranged between both first and second adjacent Fiber Bragg Grating partial reflector pairs having first and second selectable wavelengths $\lambda_1$, $\lambda_2$.

22 Claims, 4 Drawing Sheets

(ARRAY WITH GROUPING AT λ1, "ZOOM" ELEMENTS AT λ2)

U.S. PATENT DOCUMENTS

| | | |
|---|---|---|
| 5,818,585 | 10/1998 | Davis et al. . |
| 5,845,033 | 12/1998 | Berthold et al. .................... 385/12 |
| 5,892,860 | 4/1999 | Maron et al. . |
| 5,945,666 | 8/1999 | Kersey et al. . |
| 5,986,749 | 11/1999 | Wu et al. . |
| 5,987,197 | 11/1999 | Kersey . |
| 6,118,914 | 9/2000 | Davis et al. . |
| 6,191,414 | 2/2001 | Ogle et al. . |

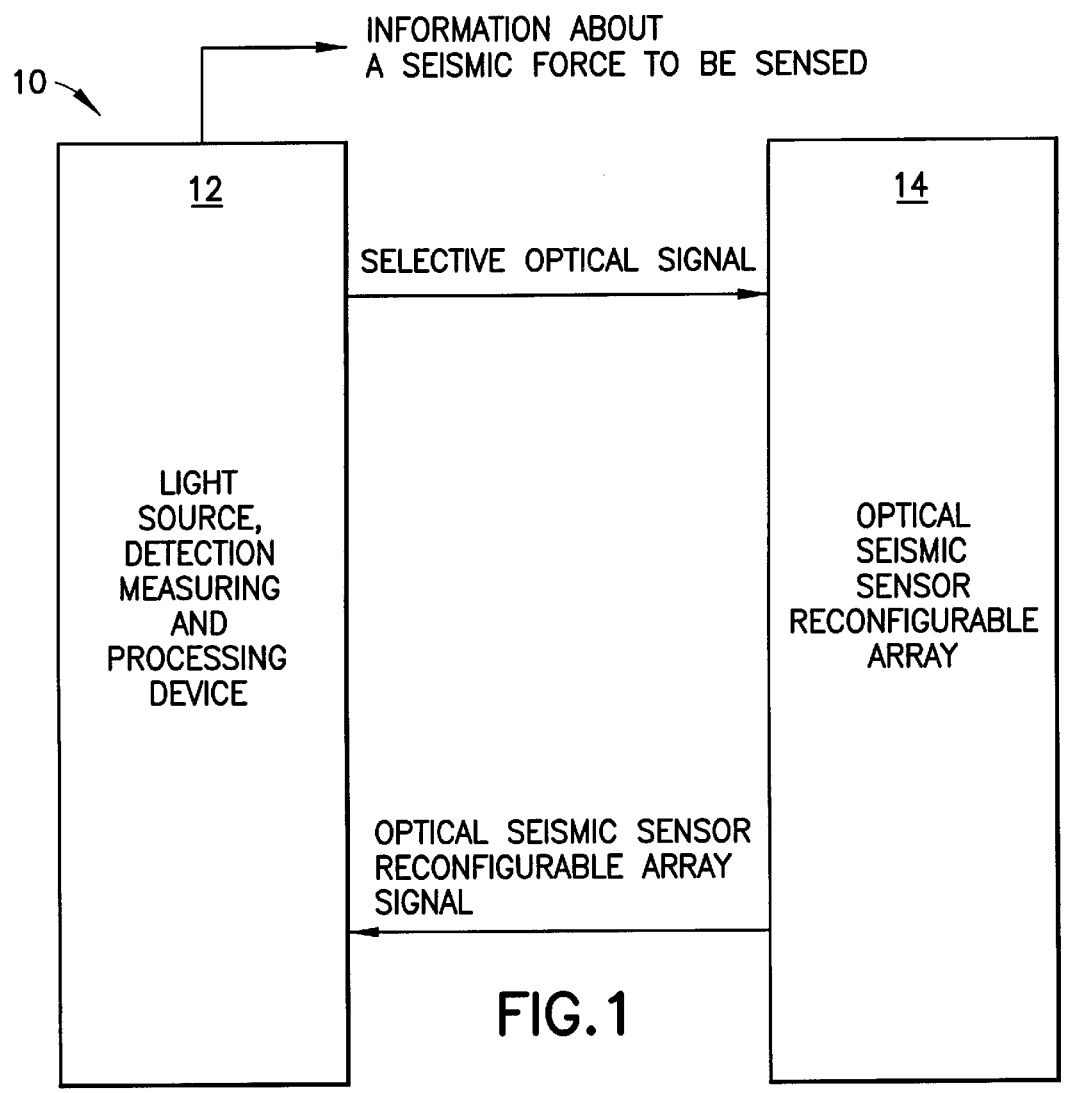

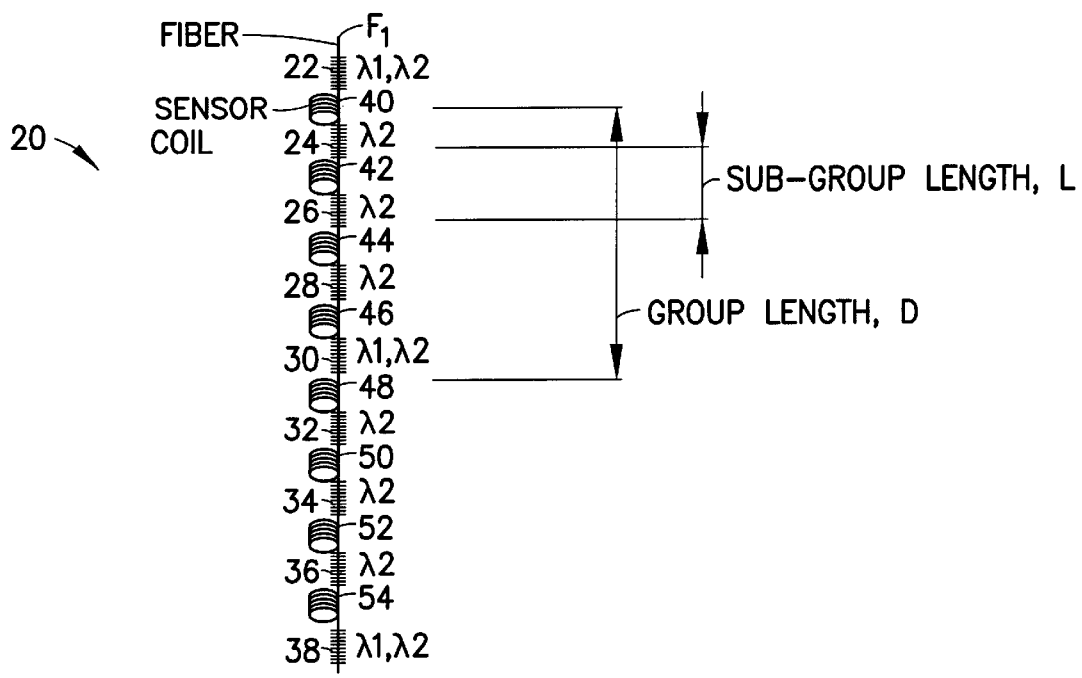
FIG.2 (ARRAY WITH GROUPING LENGTH D, SUB-GROUPS AT SPACING L)
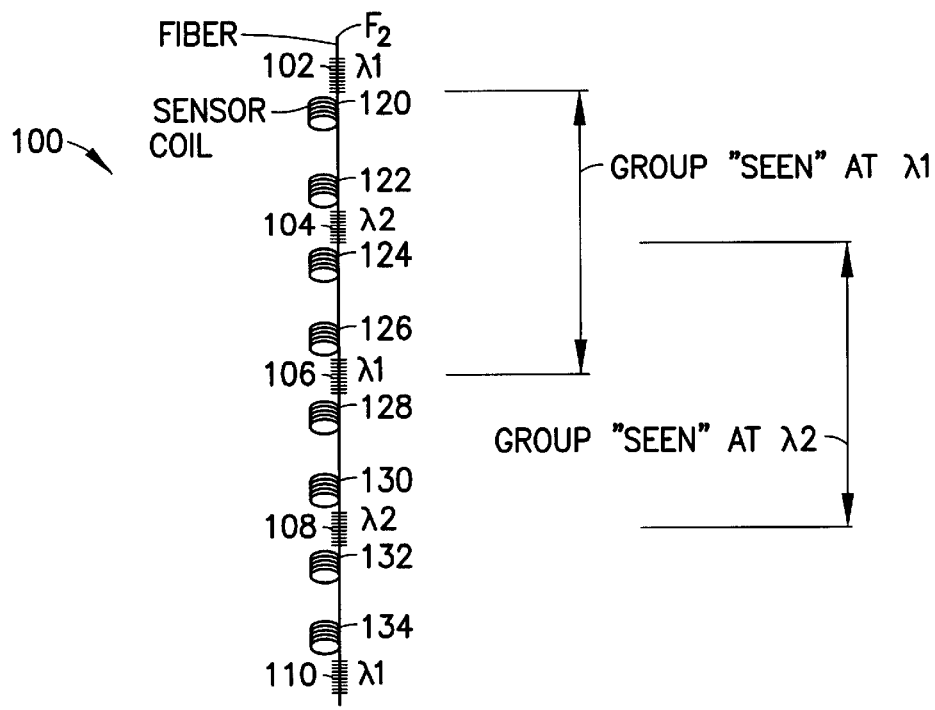
FIG.3 (STAGGERED "WINDOW" 4 SENSOR GROUPS)

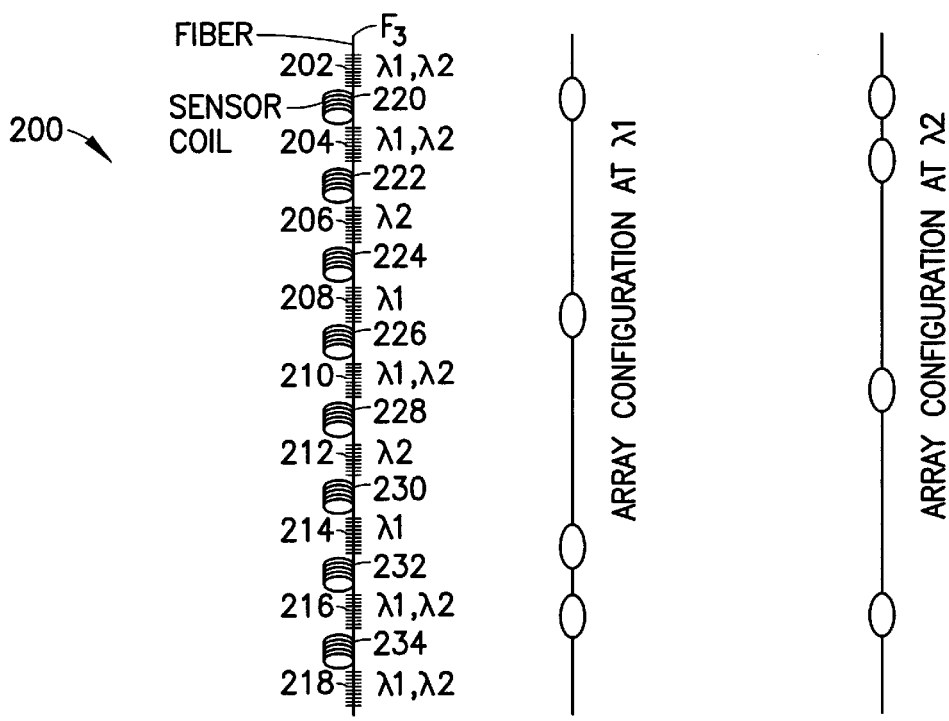
FIG. 4 (ARRAY WITH WAVELENGTH SELECTABLE ARRAY CONFIGURATIONS)
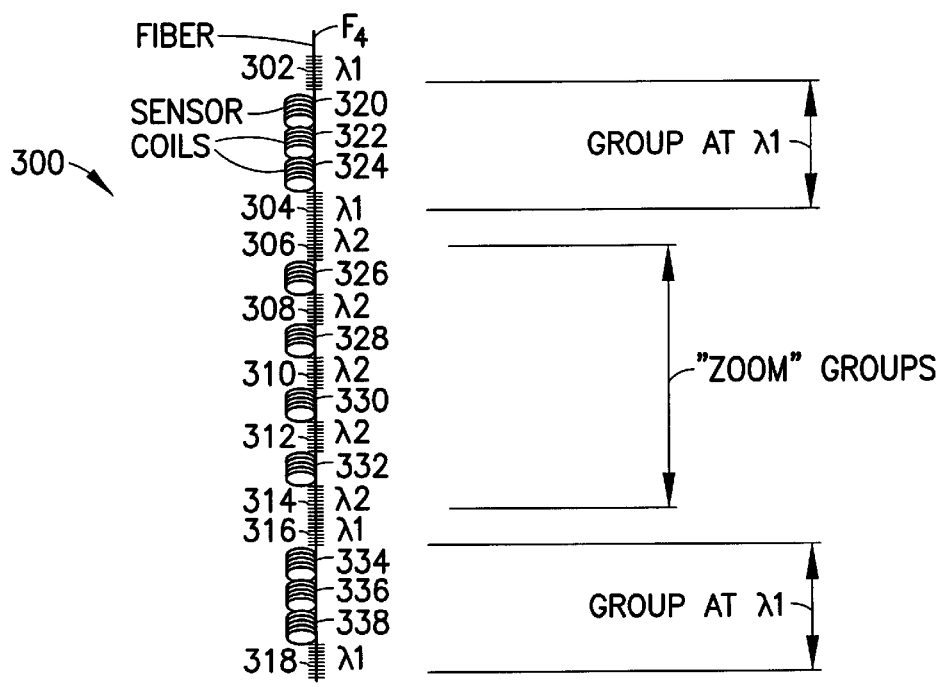
FIG. 5 (ARRAY WITH GROUPING AT λ1, "ZOOM" ELEMENTS AT λ2)

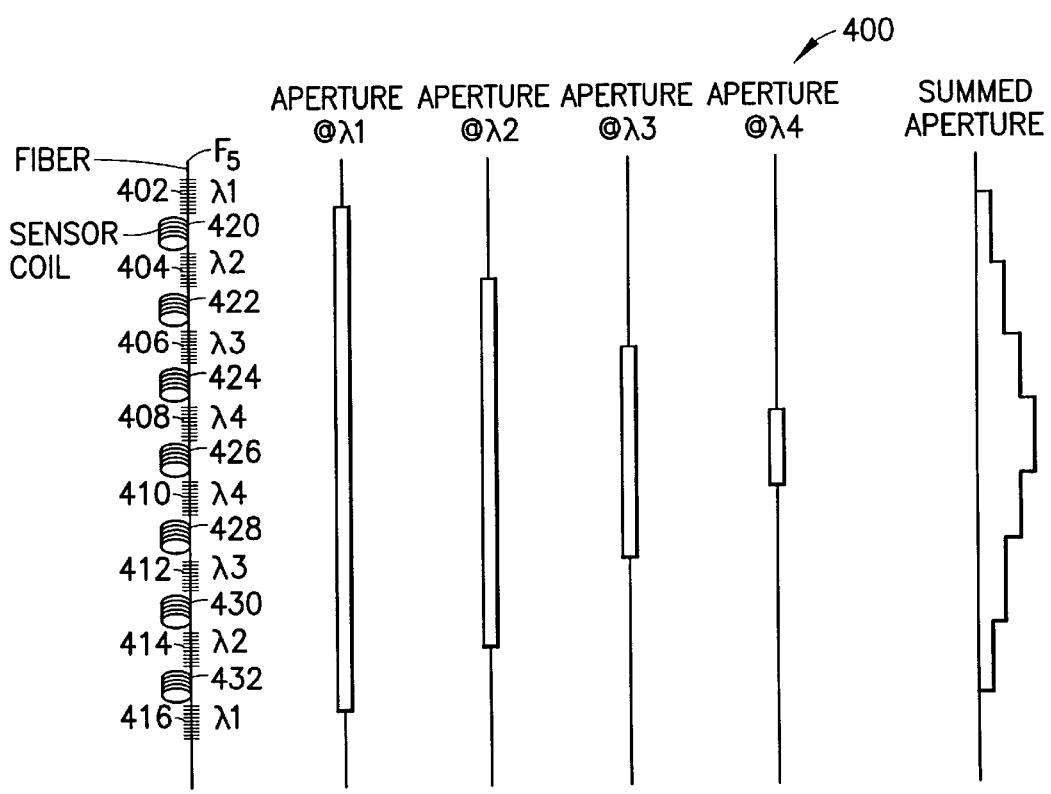
FIG. 6 (ARRAY APODIZATION (WEIGHTING) BY SUMMING GROUPS)

SELECTIVE APERTURE ARRAYS FOR SEISMIC MONITORING

BACKGROUND OF INVENTION

1. Technical Field

The present invention relates to seismic monitoring or sensing; and more particularly relates to seismic monitoring or sensing using a reconfigurable array.

2. Description of Related Art

A seismic system having distributed selectable fiber optic sensors is known in the art. The seismic system has an optical fiber with fiber optic grating based sensors distributed along a borehole of a well. Each fiber optic grating based sensor has a different wavelength for interrogating a separate fiber optic grating based sensor. The seismic system is not reconfigurable for looking at different groups of fiber optic grating based sensors distributed along a borehole of a well.

Moreover, seismic sensing systems having a hydrophone or geophone array are known that are "ganged" together in groups, also known as levels. This is done for redundancy and to improve the signal-to-noise ratio (S/N). This grouping creates a spatial length over which a seismic measurement can be made. Once hard-wired into a group and deployed, it is not feasible to interrogate the individual elements of the group. To look at an array with a higher spatial resolution capability, one would need to access these separate elements. In a typical seismic survey, a seismic array is defined and built prior to installation. One disadvantage of the related art is that once deployed it is not possible to reconfigure the array.

SUMMARY OF INVENTION

The present invention provides a new and unique seismic sensing device having a light source, detection measuring and processing device in combination with an optical seismic sensor reconfigurable array.

The light source, detection measuring and processing device provides a selective optical signal to the optical seismic sensor reconfigurable array. The light source, detection measuring and processing device also responds to an optical seismic sensor reconfigurable array signal from the optical seismic sensor reconfigurable array, for providing information about a seismic force to be sensed.

The optical seismic sensor reconfigurable array responds to the selective optical signal, and further responds to the seismic force, for providing an optical seismic sensor reconfigurable array signal containing information about the seismic force over different selective lengths of the optical seismic sensor reconfigurable array.

The optical seismic sensor reconfigurable array includes an optical fiber having optical seismic sensors, each including at least one sensor coil arranged between a respective adjacent Fiber Bragg Grating partial reflector pair with a selectable wavelength.

The optical seismic sensor reconfigurable array also includes at least two different groups of optical seismic sensors, each having a different configuration.

The optical seismic sensor reconfigurable array may include a common optical seismic sensor in the at least two different groups. The common optical seismic sensor may include a sensor coil arranged between both a first adjacent Fiber Bragg Grating partial reflector pair having a first selectable wavelength $\lambda_1$ and a second adjacent Fiber Bragg Grating partial reflector pair having a second selectable wavelength $\lambda_2$.

The sensor coil may include a mandrel having the optical fiber wrapped thereabout.

In operation, the seismic force causes a strain and a change of length of the optical fiber wrapped around the sensor coil between Fiber Bragg Grating partial reflector pairs. The strain or the change of length of the optical fiber causes a change or shift in the phase of light in the fiber coil, providing an interferometric output that is sensed by the light source, detection measuring and processing device.

One advantage of the present invention is that the optical seismic sensor reconfigurable array may be configured and reconfigured to set up the optical seismic sensors for operation in many different configurations or patterns, including variable level configuring, staggered window configuring, array reconfiguring, an array zoom configuring, and a variable apodization spatial array configuring.

The foregoing and other objects, features and advantages of the present invention will become more apparent in light of the following detailed description of exemplary embodiments thereof, as illustrated in the accompanying drawing.

BRIEF DESCRIPTION OF THE DRAWING

The drawing includes FIGS. 1–6, as follows:

FIG. 1 is a block diagram of a seismic sensing device that is the subject matter of the present invention.

FIG. 2 is a diagram of an array with grouping lengths D and A, sub-group at spacing L.

FIG. 3 is a diagram of staggered window four sensor groups.

FIG. 4 is a diagram of an array with wavelength selectable array configurations.

FIG. 5 is a diagram of an array with grouping at a first wavelength and with a zoom group at a second wavelength.

FIG. 6 is a diagram of an array apodization (weighting) by summing groups.

DETAILED DESCRIPTION OF THE INVENTION

FIG. 1: The Invention in General

FIG. 1 shows a new and unique seismic sensing device generally indicated as 10 having a light source, detection measuring and processing device 12 in combination with an optical seismic sensor reconfigurable array generally indicated as 14.

The light source, detection measuring and processing device 12 provides a selective optical signal to the optical seismic sensor reconfigurable array 14. The light source, detection measuring and processing device 12 responds to an optical seismic sensor reconfigurable array signal from the optical seismic sensor reconfigurable array 14, for providing information about a seismic force to be sensed. The information may be provided in the form of an electrical or optical signal, or an audio or visual message; and the scope of the invention is not intended to be limited to any particular manner in which the seismic force information is provided.

The optical seismic sensor reconfigurable array responds to the selective optical signal, and further responds to the seismic force, for providing an optical seismic sensor reconfigurable array signal containing information about the seismic force over different selective lengths of the optical seismic sensor reconfigurable array.

The light source, detection measuring and processing device is known in the art, includes an optical transceiver/ converter, and may be implemented using computer hardware, computer software, or a combination thereof, and may include a microprocessor-based architecture, having a microprocessor, RAM, ROM, an input/output device, and an address, data and control bus connecting the same. For example, the reader is also referred to U.S. Patent application Ser. No. 09/219,908, filed Dec. 23, 1998 (CiDRA File No. CC 0072), entitled Distributed Selectable Latent Fiber Optic Sensors, hereby incorporated by reference in its entirety, for a detailed description of an instrumentation box having an optical transceiver/converter. The scope of the invention is not intended to be limited to any particular type of light source, detection measuring and processing device.

The optical seismic sensor reconfigurable array 14 is described in detail below in relation to FIGS. 2–6. In general, the seismic sensing device 10 allows the reconfigurability of arrays via the ability to switch to different interrogation wavelengths. This concept is very simple, yet powerful. Some examples of the type of processing/reconfiguration that could be done are illustrated and discussed in the examples below, including variable level configuring, staggered window configuring, array reconfiguring, array zoom configuring, and variable apodization spatial array configuring.

FIG. 2: Variable Level Configuring

FIG. 2 shows a seismic sensing device generally indicated as 20 having a variable level configuration including an optical fiber $F_1$ with Fiber Bragg Grating partial reflectors 22, 24, 26, 28, 30, 32, 34, 36, 38 and sensor coils 40, 42, 44, 46, 48, 50, 52, 54. Along the optical fiber $F_1$, the Fiber Bragg Grating partial reflectors 22, 24, 26, 28, 30, 32, 34, 36, 38 and sensor coils 40, 42, 44, 46, 48 50, 52, 54 combine to form many different optical seismic sensors, each having at least one sensor coil arranged between a respective adjacent Fiber Bragg Grating partial reflector pair with a selectable wavelength. The Fiber Bragg Grating partial reflectors are known in the art; and the reader is again referred to U.S. Patent application Ser. No. 09/219,908, filed Dec. 23, 1998 (CiDRA File No. CC 0072), for examples of the same. The Fiber Bragg Grating partial reflector pairs may include either Bragg Gratings, multiple Bragg Gratings, or a lasing element formed with pairs of multiple Bragg Gratings. The sensor coils are also known in the art and may include a mandrel that responds to the seismic force to be sensed. The scope of the invention is not intended to be limited to any particular type of Fiber Bragg Grating or sensor coil. In operation, the seismic force causes a strain and a change of length of the optical fiber wrapped in a sensor coil between Fiber Bragg Grating partial reflector pairs. The strain or the change of length of the optical fiber causes a change or shift in the phase of light in the fiber coil, providing an interferometric output that is sensed by the light source, detection measuring and processing device 12.

As shown, the optical seismic sensor reconfigurable array 14 (FIG. 1) has different groups of optical seismic sensors that have different lengths and that are at different selectable wavelengths. A first group has a length, D, and includes two different adjacent Fiber Bragg Grating partial reflector pairs 22, 30; 30, 38 having a first selectable wavelength $\lambda_1$ and two groups of multiple sensor coils 40, 42, 44, 46; 48, 50, 52, 54 arranged therebetween. As shown, where the length D is equal to four (4), each of the adjacent Fiber Bragg Grating partial reflector pairs 22, 30; 30, 38 has four (4) respective multiple sensor coils 40, 42, 44, 46; 48, 50, 52, 54 arranged therebetween. The scope of the invention is not intended to be limited to any particular number of arrays, adjacent Fiber Bragg Grating partial reflector pairs, multiple sensor coils arranged therebetween, or wavelengths.

Another group has a subgroup length, L, and includes eight adjacent Fiber Bragg Grating partial reflector pairs 22, 24; 24, 26; 26, 28; 28, 30; 30, 32; 32, 34; 34, 36; 36, 38 having a selectable wavelength $\lambda_2$ and eight multiple sensor coils 40, 42, 44, 46, 48, 50, 52, 54 respectively arranged therebetween. As shown, for the subgroup length L is equal to one (1), each of the second adjacent Fiber Bragg Grating partial reflector pairs 22, 24; 24, 26; 26, 28; 28, 30; 30, 32; 32, 34; 34, 36; 36, 38 has a respective single sensor coil 40, 42, 44, 46; 48, 50, 52, 54 arranged therebetween. The scope of the invention is not intended to be limited to any particular number of arrays, adjacent Fiber Bragg Grating partial reflector pairs or multiple sensor coils arranged therebetween.

In FIG. 2, the Fiber Bragg Grating partial reflectors 22, 30, 38 are selectable at two different wavelengths $\lambda_1$ and $\lambda_2$. The first group having the first selectable wavelength $\lambda_1$ overlaps and includes coil sensors in the second group having the second selectable wavelength $\lambda_2$ For example, the eight single multiple sensor coils 40, 42, 44, 46 48, 50, 52, 54 are common to the first and second group.

The overlapping of the arrays in the first and second groups allows variable level configuring for interrogating different arrays having different lengths to gather information about the seismic force being sensed. Multiple arrays having different wavelengths may be simultaneously interrogated, because optical signals at one wavelength are effectively transparent to optical signals at a substantially different wavelength. The seismic sensing device 20 uses wavelength division multiplexing technology to select the array or arrays to be interrogated, although embodiments are envisioned in a time domain using time division multiplexing as well. Embodiments are also envisioned in which the optical fiber sensors may be configured using any type of phase detection system having sufficient sensitivity to measure the change in the length of the optical fiber as a function of a disturbance, such as a seismic disturbance.

One advantage of the present invention is that it provides an improvement over the prior art system of "ganged" hydrophone array systems by permitting variable level configuring of groups of sensors in the array. In the present invention, the optical fiber and Fiber Bragg Grating partial reflectors allow a sensor length to be defined by an operating wavelength—it is possible to optically sum several sensor coils at one wavelength and look at individual coils at another wavelength. This provides a type of "zoom" capability in the overall concept.

FIG. 3: Staggered Window Configuring

FIG. 3 shows a seismic sensing device generally indicated as 100 having a staggered window configuration, including an optical seismic sensor reconfigurable array having alternating, staggered, window sensor groups. The seismic sensing device 100 has an optical fiber $F_2$ with Fiber Bragg Grating partial reflectors 102, 104, 106, 108, 110 and sensor coils 120, 122, 124, 126, 128, 130, 132, 134, which are known in the art, as discussed above.

First staggered window sensor groups have two different adjacent Fiber Bragg Grating partial reflector pairs 102, 106; 106, 110 having a first selectable wavelength $\lambda_1$ and multiple coil sensors 120, 122, 124, 126; 128, 130, 132, 134 arranged therebetween. (See FIG. 3, group "seen" at $\lambda_1$.) A second staggered window sensor group includes one adjacent Fiber Bragg Grating partial reflector pair 104, 108 having a second selectable wavelength $\lambda_2$ and corresponding multiple sensor coils 124, 126; 128, 130 arranged therebetween. The two different adjacent Fiber Bragg Grating partial reflector pairs 102, 106; 106, 110 are staggered and overlapped with the one adjacent Fiber Bragg Grating partial reflector pair 104, 108. As shown, the first staggered window sensor group and the second staggered window sensor group have the same length and include four coil sensors. The first staggered window sensor group and the second staggered window sensor group may also have a different length.

One advantage of the present invention is that, with the use of Fiber Bragg Grating partial reflector pairs to delineate an interferometer in the optical fiber, interferometers can be made to physically overlap. This overlap allows the spatial sampling window to be moved down the array at an interval smaller than a physical separation of overall groups.

FIG. 4: Array Reconfiguration

FIG. 4 shows a seismic sensing device generally indicated as 200 having an optical seismic sensor reconfigurable array with wavelength selectable array configurations or groups. The seismic sensing device 200 has an optical fiber $F_3$ with Fiber Bragg Grating partial reflectors 202, 204, 206, 208, 210, 212, 214, 216, 218 and sensor coils 220, 222, 224, 226, 228, 230, 232, 234, which are known in the art as discussed above.

A first wavelength selectable array configuration has first adjacent Fiber Bragg Grating partial reflector pairs 202, 204; 208, 210; 214, 216; 216, 218 having a first selectable wavelength $\lambda_1$ arranged in a first pattern (See FIG. 4, designated as "Array config at $\lambda_1$") and sensor coils 220; 226; 232; 234 arranged therebetween. A second wavelength selectable array configuration has second adjacent Fiber Bragg Grating partial reflector pairs 202, 204; 204, 206; 210, 212; 216, 218 having a second wavelength $\lambda_2$ arranged in a second pattern (See FIG. 4, designated as "Array config at $\lambda_2$") and corresponding sensor coils 220; 222; 228; 234 arranged therebetween. The first pattern and the second pattern share common sensor coils 220, 234. The first pattern and the second pattern are configured differently, which is particularly useful for conducting directional seismic sensing or for conducting seismic sensing having broader and narrower sensitivities.

The use of Fiber Bragg Grating based interferometers allows a great deal of flexibility on how a sensor string could be "viewed". By using Fiber Bragg Grating elements to define the sensors, a variety of different array patterns could be present in the array system. This requires additional hardware, but allows the design to be changed by a simple switch to a different interrogation wavelength, or set of wavelengths.

The scope of the invention is not intended to be limited to any particular number of array configuration(s) or pattern(s) of an array configuration.

FIG. 5: Array Zoom

FIG. 5 shows a seismic sensing device generally indicated as 300 having an optical seismic sensor reconfigurable array with three groups at one selectable wavelength and a zoom group at a different selectable wavelength. The seismic sensing device 300 includes an optical fiber $F_4$ with Fiber Bragg Grating partial reflectors 302, 304, 306, 308, 310, 312, 314, 316, 318 and sensor coils 320, 322, 324, 326, 328, 330, 332, 334, 336, 338, which are known in the art, as discussed above.

The three groups are selectable at a first selectable wavelength $\lambda_1$ and include Fiber Bragg Grating partial reflector pairs 302, 304; 304, 316; 316, 318 and multiple sensor coils 320, 322, 324; 326, 328, 330, 332; 334, 336, 338 arranged therebetween.

The zoom group is selectable at a second selectable wavelength $\lambda_2$ and includes Fiber Bragg Grating partial reflector pairs 306, 308; 310, 312; 314 and multiple sensor coils 326, 328, 330, 332 respectively arranged therebetween. One of the three groups selectable at a first selectable wavelength $\lambda_1$ having Fiber Bragg Grating partial reflector pairs 304, 316 and multiple sensor coils 326, 328, 330, 332 arranged therebetween and the zoom group overlap and share common sensor coils 326, 328, 330, 332 with the zoom group.

In operation, for a given array design with a series of hydrophone or geophone groups, spaced out at a distance X between groups, a seismic shot may provide data that indicates the need to perform higher spatial resolution sensing over a segment of the array to target a particular seismic feature of subsurface anomaly. This could be accomplished by incorporating sets of otherwise inactive/dormant sensors in between the otherwise "designed" array. This would allow the system to switch to a "zoom" mode to allow seismic sensing with much improved spatial resolution. The segment which is "read" could be a function of the wavelength used to interrogate the system. This provides a "course" and "fine" sensing capability. Simultaneous "reading" of both course and fine arrays would also be possible.

FIG. 6: Variable Spatial Apodization

FIG. 6 shows a seismic sensing device generally indicated as 400 having an optical seismic sensor reconfigurable array with array apodization by summing aperture groups. The seismic sensing device includes an optical fiber $F_5$ with Fiber Bragg Grating partial reflectors 402, 404, 406, 408, 410, 412, 414, 416 and sensor coils 420, 422, 424, 426, 428, 430, 432, which are known in the art, as discussed above.

A first aperture group includes a first adjacent Fiber Bragg Grating partial reflector pair 402, 416 having a first selectable wavelength $\lambda_1$ and seven sensor coils 420, 422, 424, 426, 428, 430, 432 arranged therebetween. See FIG. 6, the aperture designated as "Aperture at $\lambda_1$".

A second aperture group includes a second adjacent Fiber Bragg Grating partial reflector pair 404, 414 having a second selectable wavelength $\lambda_2$ and five sensor coils 422, 424, 426, 428, 430 arranged therebetween. See FIG. 6, the aperture designated as "Aperture at $\lambda_2$".

A third aperture group includes a third adjacent Fiber Bragg Grating partial reflector pair 406, 412 having a third selectable wavelength $\lambda_3$ and three sensor coils 424, 426, 428 arranged therebetween. See FIG. 6, the aperture designated as "Aperture at $\lambda_3$".

A fourth aperture group includes a fourth adjacent Fiber Bragg Grating partial reflector pair 408, 410 having a fourth selectable wavelength $\lambda_4$ and one sensor coil 426 arranged therebetween. See FIG. 6, the aperture designated as "Aperture at $\lambda_4$".

In FIG. 6, the aperture designated as "Summed Aperture" is a summation of the optical signals provided back to the light source, detection measuring and processing device 12 (FIG. 1) from the first adjacent Fiber Bragg Grating partial reflector pair 402, 416, the second adjacent Fiber Bragg Grating partial reflector pair 404, 414, the third adjacent Fiber Bragg Grating partial reflector pair 406, 412 and the fourth adjacent Fiber Bragg Grating partial reflector pair 408, 410.

A typical hydrophone or geophone group, or hydrophone or geophone array, has a definable "antenna" pattern that governs its angular response to incoming acoustics. The array pattern can be important in some applications. By optically grouping hydrophone or geophone elements, and reading the system at a variety of wavelengths, an apodization characteristic can be simulated.

Scope of the Invention

The scope of the invention is not intended to be limited to sensing seismic forces, for example, embodiments are envisioned of a sensing device for sensing of a parameter of an object having an optical signal processor device in combination with an optical sensor reconfigurable array. The optical signal processor device responds to an optical sensor reconfigurable array signal, for providing information about a parameter to be sensed. The optical sensor reconfigurable array responds to a selective optical signal from an optical light source, and further responds to the parameter to be sensed, for providing the optical sensor reconfigurable array signal containing information about the parameter to be sensed over a selective length of the optical sensor reconfigurable array.

Although the invention has been described and illustrated with respect to exemplary embodiments thereof, the foregoing and various other additions and omissions may be made therein and thereto without departing from the spirit and scope of the present invention.

I claim:

1. A seismic sensing device, comprising:
   a light source, detection measuring and processing device for providing an optical signal having different interrogation wavelengths, and being responsive to an optical seismic sensor reconfigurable array signal, for providing information about a seismic force to be sensed; and
   an optical seismic sensor reconfigurable array having sub-array configurations with different lengths for selectively interrogating the seismic force to be sensed with different spatial resolutions, each sub-array configuration having a sensor coil arranged between a Bragg grating reflector pair, the optical seismic sensor reconfigurable array being responsive to the different interrogation wavelengths in the optical signal, and further responsive to the seismic force, for providing an optical seismic sensor reconfigurable array signal containing information about the seismic force over different selective lengths of the optical seismic sensor reconfigurable array.

2. A seismic sensing device according to claim 1,
   wherein the optical seismic sensor reconfigurable array includes an optical fiber having optical seismic sensors, each having at least one sensor coil arranged between a respective adjacent Fiber Bragg Grating partial reflector pair having a selectable wavelength; and
   wherein the optical seismic sensor reconfigurable array has at least two different groups of optical seismic sensors, each having a different configuration.

3. A seismic sensing device according to claim 1,
   wherein the optical seismic sensor reconfigurable array includes a common optical seismic sensor having a sensor coil arranged between both a first adjacent Fiber Bragg Grating partial reflector pair having a first selectable wavelength $\lambda_1$ and a second adjacent Fiber Bragg Grating partial reflector pair having a second selectable wavelength $\lambda_2$.

4. A seismic sensing device according to claim 1,
   wherein the optical seismic sensor reconfigurable array includes a first optical seismic sensor array having multiple sensor coils arranged between first adjacent Fiber Bragg Grating partial reflector pairs having a first selectable wavelength $\lambda_1$; and
   wherein the optical seismic sensor reconfigurable array includes a second optical seismic sensor array having at least one of the multiple sensor coils arranged between second adjacent Fiber Bragg Grating partial reflector pairs having a second selectable wavelength $\lambda_2$ so that at least one of the multiple sensor coils is a common sensor coil arranged between both the first adjacent Fiber Bragg Grating partial reflector pair and the second adjacent Fiber Bragg Grating partial reflector pair.

5. A seismic sensing device according to claim 3,
   wherein the optical seismic sensor reconfigurable array has a common Fiber Bragg Grating partial reflector having a first selectable wavelength $\lambda_1$ and a second selectable wavelength $\lambda_2$.

6. A seismic sensing device according to claim 1,
   wherein the optical seismic sensor reconfigurable array has a common adjacent Fiber Bragg Grating partial reflector pair having Fiber Bragg Grating partial reflectors with both a first selectable wavelength $\lambda_1$ and a second selectable wavelength $\lambda_2$.

7. A seismic sensing device according to claim 1,
   wherein the optical seismic sensor reconfigurable array has different length sensor groups that are wavelength selectable;
   wherein a first group has a first length and includes multiple sensor coils arranged between a first adjacent Fiber Bragg Grating partial reflector pair with a first selectable wavelength $\lambda_1$; and
   wherein a second group has a second and different length and includes at least one of the multiple sensor coils arranged between a second adjacent Fiber Bragg Grating partial reflector pair having a second selectable wavelength $\lambda_2$.

8. A seismic sensing device according to claim 7,
   wherein each of the first adjacent Fiber Bragg Grating partial reflector pairs has respective multiple sensor coils arranged therebetween; and
   wherein each of the second adjacent Fiber Bragg Grating partial reflector pairs has a respective single sensor coil arranged therebetween.

9. A seismic sensing device according to claim 8,
   wherein the respective multiple sensor coils of each of the first adjacent Fiber Bragg Grating partial reflector pairs overlap and include the respective single sensor coil of a respective second adjacent Fiber Bragg Grating partial reflector pair.

10. A seismic sensing device according to claim 1,
    wherein the optical seismic sensor reconfigurable array includes staggered window sensor groups;
    wherein a first staggered window sensor group has multiple coil sensors arranged between first adjacent Fiber Bragg Grating partial reflector pairs having a first selectable wavelength $\lambda_1$;
    wherein a second staggered window sensor group includes corresponding multiple sensor coils arranged between second adjacent Fiber Bragg Grating partial reflector pairs having a second selectable wavelength $\lambda_2$; and
    wherein the first adjacent Fiber Bragg Grating partial reflector pairs are staggered and overlapped with the second adjacent Fiber Bragg Grating partial reflector pairs.

11. A seismic sensing device according to claim 10, wherein the first staggered window sensor group and the second staggered window sensor group have the same length.

12. A seismic sensing device according to claim 10, wherein the first staggered window sensor group and the second staggered window sensor group have a different length.

13. A seismic sensing device according to claim 1,
wherein the optical seismic sensor reconfigurable array includes wavelength selectable array configurations;
wherein a first wavelength selectable array configuration has sensor coils arranged between first adjacent Fiber Bragg Grating partial reflector pairs having a first selectable wavelength $\lambda_1$ in a first pattern;
wherein a second wavelength selectable array configuration has corresponding sensor coils arranged between second adjacent Fiber Bragg Grating partial reflector pairs having a second wavelength $\lambda_2$ in a second pattern; and
wherein the first pattern and the second pattern are different for conducting different array processing, including direction sensing.

14. A seismic sensing device according to claim 1,
wherein the optical seismic sensor reconfigurable array includes a group and a zoom group;
wherein the group has multiple sensor coils arranged between a first Fiber Bragg Grating partial reflector pair having a first selectable wavelength $\lambda_1$; and
wherein the zoom group has at least one of the multiple sensor coils arranged between a respective Fiber Bragg Grating partial reflector pair having a second selectable wavelength $\lambda_2$.

15. A seismic sensing device according to claim 14,
wherein in the zoom group each of the multiple sensor coils is arranged between a respective Fiber Bragg Grating partial reflector pair having a second selectable wavelength $\lambda_2$.

16. A seismic sensing device according to claim 1,
wherein the optical seismic sensor reconfigurable array includes array apodization by summing aperture groups;
wherein a first aperture group has n multiple sensor coils arranged between a first adjacent Fiber Bragg Grating partial reflector pair having a first selectable wavelength $\lambda_1$;
wherein a second aperture group has at least n-2 of the multiple sensor coils arranged between both a second adjacent Fiber Bragg Grating partial reflector pair having a second selectable wavelength $\lambda_2$ as well as the first adjacent Fiber Bragg Grating partial reflector pair.

17. A seismic sensing device according to claim 16,
wherein a third aperture group has at least n-4 of the multiple sensor coils arranged between a third adjacent Fiber Bragg Grating partial reflector pair having a third selectable wavelength $\lambda_3$ as well as between the adjacent first Fiber Bragg Grating partial reflector pair and the second adjacent Fiber Bragg Grating partial reflector pair.

18. A seismic sensing device according to claim 16,
wherein a fourth aperture group has at least n-6 of the multiple sensor coils arranged between a fourth adjacent Fiber Bragg Grating partial reflector pair having a fourth selectable wavelength $\lambda_4$, as well as between the first adjacent Fiber Bragg Grating partial reflector pair, the second adjacent Fiber Bragg Grating partial reflector pair and the third adjacent Fiber Bragg Grating partial reflector pair.

19. A seismic sensing device according to claim 16, wherein n equals an integer 7.

20. A sensing device for sensing of a parameter of an object, comprising:
an optical signal processor device, responsive to an optical sensor reconfigurable array signal, for providing information about a parameter to be sensed; and
an optical sensor reconfigurable array having sub-array configurations with different lengths for selectively interrogating the parameter to be sensed with different spatial resolutions, each sub-array configuration having a sensor coil arranged between a Bragg grating reflector pair, the optical seismic sensor reconfigurable array being responsive to an optical signal having different interrogation wavelengths from an optical light source, and further responsive to the parameter to be sensed, for providing the optical sensor reconfigurable array signal containing information about the parameter to be sensed over a selective length of the optical sensor reconfigurable arrays.

21. A sensing device according to claim 20,
wherein the optical sensor reconfigurable array includes an optical fiber having optical sensors, each having at least one sensor arranged between a respective adjacent Fiber Bragg Grating partial reflector pair having a selectable wavelength.

22. A sensing device according to claim 20,
wherein the optical sensor reconfigurable array includes a common optical sensor arranged between both a first adjacent Fiber Bragg Grating partial reflector pair having a first selectable wavelength $\lambda_1$ and a second adjacent Fiber Bragg Grating partial reflector pair having a second selectable wavelength $\lambda_2$.

* * * * *

UNITED STATES PATENT AND TRADEMARK OFFICE
CERTIFICATE OF CORRECTION

PATENT NO. : 6,274,863 B1　　　　　　　　　　　　　　　　　　　　Page 1 of 1
DATED : August 14, 2001
INVENTOR(S) : Kersey It is certified that error appears in the above-identified patent and that said Letters Patent is hereby corrected as shown below:

Column 2,
Line 1, before "sensor" insert -- The --.

Column 4,
Line 21, after "$\lambda_2$" insert -- . --.

Signed and Sealed this

Twelfth Day of March, 2002

Attest:

JAMES E. ROGAN
*Attesting Officer*　　　*Director of the United States Patent and Trademark Office*